United States Patent
Bartman et al.

(10) Patent No.: US 6,251,213 B1
(45) Date of Patent: *Jun. 26, 2001

(54) LAMINATING CONSTRUCTION ADHESIVE COMPOSITIONS WITH IMPROVED PERFORMANCE

(75) Inventors: Benjamin Bartman, Maple Glen; Kathleen Anne Hughes, Blue Bell; Eric Karl Eisenhart; Joann Marie Eisenhart, both of Doylestown, all of PA (US)

(73) Assignee: Rohm and Haas Company, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/056,264

(22) Filed: Apr. 30, 1993

Related U.S. Application Data

(63) Continuation of application No. 07/955,548, filed on Oct. 1, 1992, now abandoned.

(51) Int. Cl.[7] .......................................... C09J 5/02
(52) U.S. Cl. .......................... 156/327; 524/561; 524/564; 524/823; 524/833; 525/330.2; 525/369; 428/514
(58) Field of Search ............................ 156/327; 524/564, 524/833, 561, 823; 428/514; 525/330.2, 369

(56) References Cited

U.S. PATENT DOCUMENTS

| | | | |
|---|---|---|---|
| 3,006,799 | * 10/1961 | Adams et al. | 156/327 |
| 3,563,851 | * 2/1971 | Armour et al. | 156/327 |
| 3,978,016 | * 8/1976 | Perronin et al. | 524/561 |
| 4,316,830 | * 2/1982 | Mallon | 524/833 |
| 4,540,739 | * 9/1985 | Midgley | 524/823 |
| 4,617,343 | 10/1986 | Walker et al. . | |
| 5,008,329 | * 4/1991 | Abe et al. | 524/833 |

FOREIGN PATENT DOCUMENTS

| | | |
|---|---|---|
| 1141895 | 2/1983 | (CA) . |
| 1274644 | 9/1990 | (CA) . |
| 46-27677 | * 8/1971 | (JP) ..................... 524/823 |

OTHER PUBLICATIONS

*Polymer Handbook*, Edited by J. Brandrup and E.H. Immergut, John Wiley & Sons, New York, 1975, pp. III–144,145, 151.*

* cited by examiner

*Primary Examiner*—John J. Gallagher
(74) *Attorney, Agent, or Firm*—Ronald D. Bakule

(57) ABSTRACT

Aqueous laminating construction adhesive compositions incorporating a one-part adhesive copolymer, the copolymer being a vinyl ester/acrylic copolymer containing from about 0.1% to about 20%, by weight based on copolymer weight, of a copolymerized polar monomer, the copolymer having a Tg from about 10° C. to about −35 C. are provided which exhibit a good balance of high temperature and ambient temperature adhesion performance in a one-part adhesive composition.

7 Claims, No Drawings

LAMINATING CONSTRUCTION ADHESIVE COMPOSITIONS WITH IMPROVED PERFORMANCE

This application is a Continuation-in-part of U.S. Ser. No. 07/955,548, filed Oct. 1, 1992, and entitled "LAMINATING CONSTRUCTION ADHESIVE COMPOSITIONS WITH IMPROVED PERFORMANCE", now abandoned.

FIELD OF THE INVENTION

This invention relates to aqueous vinyl ester/acrylic-based laminating construction adhesive compositions with improved performance.

BACKGROUND OF THE INVENTION

Major portions of the laminating adhesives industry such as, for example, the construction adhesives industry require a laminating adhesive to permanently bond films and foils including plastic films such as, for example, plasticized polyvinyl chloride films and cellulosic foils such as, for example, decorative (printed) paper foils to construction substrates. Construction substrates include porous substrates such as, for example, particle board, plywood, hardboard, pressboard, chipboard, fiberboard, and strandboard.

Present adhesives cannot achieve a useful balance of high temperature and ambient temperature property performance in a one-part adhesive composition. In a one-part adhesive composition, a relatively hard copolymer will deliver adequate high temperature performance; however, ambient temperature performance may be inadequate. Adding a plasticizer to a relatively hard copolymer improves the ambient temperature adhesive performance but only with attrition in high temperature adhesive performance.

One solution to this problem is to employ a two-part adhesive composition in which at least one reactive copolymer is mixed with a second reactive agent, which may be low in molecular weight or polymeric. Such two-part systems are problematic in terms of handling, expense, and stability of the admixed composition.

We have now found that aqueous laminating construction adhesive compositions incorporating a one-part adhesive copolymer, the copolymer being a vinyl ester/acrylic copolymer containing from about 0.1% to about 20%, by weight based on copolymer weight, of a copolymerized polar monomer, the copolymer having a Tg from about 10 C. to about –35 C., preferably from about –5 C. to about –25 C., exhibit a good balance of high temperature and ambient temperature adhesion performance in a one-part adhesive composition.

DESCRIPTION OF THE PRIOR ART

U.S. Pat. No. 4,694,056 discloses an aqueous pressure sensitive adhesive containing a copolymer of an alkyl acrylate or vinyl ester, or both, an acid functional comonomer, and a polyfunctional copolymerizable monomer.

U.S. Pat. No. 5,100,944 discloses a water-borne packaging and converting adhesive which contains 10–98 parts dispersion of a vinyl acetate homo-/co-/ter-polymer, 2–30 parts by weight of plasticizer, and 1–20 parts by weight of ethylene glycol diacetate (EGDA) as the sole organic solvent.

U.S. Pat. No. 4,540,739 discloses aqueous based pressure sensitive adhesives which incorporate a latex which contains from about 0.5 to about 40 weight percent of a $C_{3-9}$ ethylenically unsaturated carboxylic acid, the latex having been neutralized to a pH of equal to or greater than about 6 with an alkali metal hydroxide or salt.

None of the above patents disclose an aqueous laminating construction adhesive composition incorporating a one-part adhesive copolymer, the copolymer being a vinyl ester/acrylic copolymer containing from about 0.1% to about 20%, by weight based on copolymer weight, of a copolymerized polar monomer, the copolymer having a Tg from about 10 C. to about –30 C.

SUMMARY OF THE INVENTION

Aqueous vinyl ester/acrylic-based laminating construction adhesive compositions incorporating a one-part adhesive copolymer are provided. A method for laminating construction substrates is also provided.

DETAILED DESCRIPTION OF THE INVENTION

This invention is directed to aqueous laminating construction adhesive compositions incorporating a one-part adhesive copolymer, the copolymer being a vinyl ester/acrylic copolymer containing from about 0.1% to about 20%, by weight based on copolymer weight, of a copolymerized polar monomer, the copolymer having a Tg from about 10 C. to about –35 C., preferably from about –5 C. to about –25 C. which exhibit a good balance of high temperature and ambient temperature adhesion performance in a one-part adhesive composition.

Glass transition temperatures (Tgs) herein are those calculated as a weighted average of the homopolymer Tg values, that is, for calculating the Tg of a copolymer of monomers M1 and M2, $$Tg(calc.) = w(M1) \times Tg(M1) + w(M2) \times Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2

The glass transition temperature of homopolymers may be found, for example, in "Polymer Handbook", edited by J. Brandrup and E. H. Immergut, Interscience Publishers. By "C", herein is meant "degrees centigrade".

The aqueous vinyl ester/acrylic copolymers of the composition of this invention contain at least one copolymerized vinyl ester. Vinyl esters are ethylenically unsaturated ester monomers such as, for example, vinyl acetate, vinyl propionate, and vinyl versatate. Vinyl acetate is preferred.

The aqueous vinyl ester/acrylic copolymers of the composition of this invention contain at least one copolymerized acrylic monomer. Acrylic monomers are defined herein to include esters of (meth)acrylic acid, amides of (meth)acrylic acid, nitriles of (meth)acrylic acid, esters of crotonic acid, and the like.

Acrylic ester monomers such as, for example, methyl acrylate, ethyl acrylate, butyl acrylate, 2-ethylhexyl acrylate, decyl acrylate, methyl methacrylate, ethyl methacrylate, butyl methacrylate, and lauryl methacrylate may be used, subject to the Tg restrictions on the copolymer as stated herein. Acrylate monomers are preferred as a result of their low Tgs and the ease of polymerization with vinyl ester monomers. Butyl acrylate and 2-ethylhexyl acrylate are more preferred.

The aqueous vinyl ester/acrylic copolymers of the composition of this invention contain a copolymerized ethylenically unsaturated polar monomer such as, for example, a monomer containing a hydroxyl group such as, for example, hydroxyethyl (meth)acrylate, hydroxypropyl (meth)acrylate, alkylolated amides such as, for example N-methylol (meth)acrylamide; a monomer containing an amide group such as, for example, (meth)acrylamide; a monomer containing an amino group such as, for example, dimethylaminoethyl (meth)acrylate; and a monomer containing a (carboxylic acid group,) the anhydride, or the salt thereof, such as, for example, (meth)acrylic acid, maleic acid, itaconic acid, crotonic acid, sodium vinyl sulfonate, and fumaric acid; at a level from 0.1% to about 20% by weight, based on the weight of the copolymer. Copolymerized ethylenically unsaturated carboxylic acid monomer at a level from about 0.2 to about 10% by weight, based on the weight of the copolymer is preferred. Copolymerized acrylic acid at a level from about 0.2 to about 10% by weight, based on the weight of the copolymer is more preferred.

When a carboxylic acid is incorporated into the aqueous vinyl ester/acrylic copolymer, the acid groups may be partially or wholly neutralized. Preferred is neutralization of about 5% to 200% of the equivalents of copolymerized acid. More preferred is neutralization of about 25% to 100% of the equivalents of copolymerized acid. The copolymerized carboxylic acid groups may be neutralized with a nonvolatile base such that substantially all of the nonvolatile base remains in the adhesive composition during the drying process. The copolymerized carboxylic acid groups may be neutralized with inorganic or organic bases or with salts of bases with weak acids such as, for example, sodium formate, potassium lactate, sodium citrate, potassium acetate, and sodium carbonate.

When low levels of precrosslinking or gel content are desired, low levels of multi-ethylenically unsaturated monomers such as, for example, allyl (meth)acrylate, diallyl phthalate, 1,4-butylene glycol di(meth)acrylate, 1,6-hexanediol di(meth)acrylate, and the like, may be used at a level of from about 0.01% to about 5%, by weight based on the weight of the copolymer.

The aqueous vinyl ester/acrylic copolymers of this invention may be prepared by various addition polymerization techniques. Emulsion polymerization is preferred. The vinyl ester/acrylic emulsion copolymers may be prepared by techniques for polymerizing ethylenically-unsaturated monomers which are well known in the art. Colloidal stabilization, anionic or nonionic surfactant stabilization, or mixtures thereof, may be used. Stabilization by a colloidal stabilizer such as, for example, hydroxyethyl cellulose, N-vinyl pyrollidone, polyvinyl alcohol, partially acetylated polyvinyl alcohol, carboxymethyl cellulose, gum arabic, and the like is preferred. More preferred is stabilization by polyvinyl alcohol at a level from about 0.05% to about 10% by weight, based on the weight of the emulsion copolymer plus a nonionic surfactant. The polymerization reaction may be initiated by various methods known in the art such as, for example, by using the thermal decomposition of an initiator and by using an oxidation-reduction reaction to generate free radicals to effect the polymerization.

Chain transfer agents including mercaptans, polymercaptans, and halogen compounds may be used in the polymerization mixture in order to moderate the molecular weight of the vinyl ester/acrylic emulsion copolymer. Generally, from 0% to about 5% by weight, based on the weight of the polymeric binder, of $C_2$–$C_{20}$ alkyl mercaptans, 3-mercaptopropionic acid, or esters of 3-mercaptopropionic acid, may be used. Preferred is from 0.05% to about 0.75% by weight, based on the weight of the polymeric binder, of dodecyl mercaptan or methyl 3-mercaptopropionate.

The particles of the vinyl ester/acrylic emulsion copolymer are from about 100 nanometers to about 4000 nanometers in diameter, as measured using a Coulter LS-130 instrument, which employs a light scattering technique. Further, broad particle size distributions and polymodal particle size distributions such as those disclosed in U.S. Pat. Nos. 4,384,056 and 4,539,361, hereby incorporated herein by reference, may be employed.

The solids content of the vinyl ester/acrylic emulsion copolymer may be from about 30% to about 70% by weight. Preferred is a solids content from about 45 to about 60% by weight.

The viscosity of the vinyl ester/acrylic emulsion copolymer may be from about 200 cps. to about 20,000 cps, as measured by a Brookfield viscometer (Model LVT using Spindle #3 at 12 RPM.). Preferred is a viscosity from about 200 cps. to about 5000 cps.

The aqueous laminating construction adhesive composition may contain, in addition to the vinyl ester/acrylic emulsion copolymer, conventional treatment components such as, for example, emulsifiers, pigments, fillers, anti-migration aids, coalescents, thickeners, humectants, wetting agents, biocides, plasticizers, organosilanes, anti-foaming agents, colorants, waxes, and anti-oxidants.

In an alternative embodiment a one-part aqueous wet laminating adhesive composition containing an adhesive copolymer which is a vinyl ester/ethylene copolymer containing a copolymerized carboxylic acid monomer, the polymer having a glass transition temperature from about 0° C. to about −15° C.; wherein the copolymerized carboxylic acid is neutralized with from about 1% to about 10%, by weight based on the vinyl ester/ethylene copolymer weight, of a nonvolatile base, may be formed. In an alternative method of wet-laminating a film or foil substrate and a construction substrate the formed one-part aqueous wet laminating adhesive composition containing an adhesive copolymer which is a vinyl ester/ethylene copolymer as described above may be applied to a first substrate, then contacted with a second substrate, and then dried.

The aqueous laminating construction adhesive composition may be applied to a substrate by conventional techniques such as, for example, roll coating, rod coating, knife coating, gravure printing, curtain coating, or the like.

The aqueous laminating adhesive composition, after it is applied to a substrate, may be heated to effect drying. The duration and temperature of heating will affect the rate of drying, processability and handleability, and property development of the treated substrate. Heat treatment at about 30 C. to about 250 C. for a period of time between about 3 seconds to about 15 minutes may be carried out.

The aqueous laminating adhesive composition may be used for applications such as, for example, construction adhesives to permanently bond plastic or paper films such as, for example, plasticized or unplasticized polyvinyl chloride and printed paper foils; and construction substrates such as, for example particleboard, plywood, hardboard, pressboard, chipboard, fiberboard, and strandboard.

The following examples are intended to illustrate the laminating adhesive compositions. They are not intended to limit the invention as other applications of the invention will be obvious to those of ordinary skill in the art.

The following abreviations are used throughout:

| | |
|---|---|
| D.I. = deionized | HEA = hydroxyethyl acrylate |
| AA = acrylic acid | AM = acrylamide |
| C. = degrees Centigrade | IA = itaconic acid |
| NMA = N-methylol acrylamide | SVS = sodium vinyl sulfonate |
| KOAc = potassium acetate | pli = pounds per linear inch |
| cps = centipoises | rpm = revolutions per minute |
| (meth)acrylate = acrylate or methacrylate | |

EXAMPLE 1

Preparation of Vinyl Ester/Acrylic Copolymer

Preparation of Sample 1. A stirred reactor containing 500 g. of D.I. water was heated to 65° C. under nitrogen. Then 2 g of a 0.1 wt. % solution of iron (II) sulfate in water was added, followed by a solution of 0.5 g of 30 wt. % hydrogen peroxide (in water) dissolved in 10 g of DI water. A feed of a monomer mixture consisting of: 590 g of DI water, 300 g of a 20% solution of Airvol-205 (partially hydrolyzed polyvinyl alcohol; molecular weight 20,000) in water, 30 g of a nonylphenol 10 mole ethoxylate, 500 g of vinyl acetate, 1480 g of n-butyl acrylate, and 20 g of acrylic acid, was started. The monomer mixture was fed according to the following schedule: 5 g/min for 15 min, then 10 g/min for the next 15 min, 15 g/min for 15 min, and then the feed was finished at 20 g/min. Total feed time was approximately 165 min. At the same time as the monomer mixture feed, the following two solutions were cofed: 4.0 g of 30 wt. % hydrogen peroxide (in water) dissolved in 43 g of DI water and 2.1 g of sodium sulphoxylate formaldehyde dissolved in 46 g of DI water, according to the following schedule: 0.2 g/min for 15 min, 0.25 g/min for 15 min, 0.3 g/min for 15 min, 0.25 g/min for 15 min, then 0.2 g/min until 15 min after the completion of the monomer mixture feed, and then 0.5 g/min for the remainder of the solutions. At the completion of the monomer mixture feed an additional 45 g of DI water was added to the reaction. At the completion of the hydrogen peroxide and sodium sulphoxylate formaldehyde feeds the reaction was cooled and adjusted to pH 4.5 with a 15 wt. % solution of sodium carbonate in water. Sample 1 had a solids content of 55.3%, Brookfield viscosity (#3 spindle at 12 rpm) of 2,600 cps, and a Tg(calc.)=−24 C.

EXAMPLE 2

Preparation of Vinyl Ester/Acrylic Copolymer

Preparation of Sample 2. A stirred reactor containing 200.0 g. of deionized (D.I.) water was heated to 65° C. under nitrogen. Then 0.8 g of a 0.1 wt. % solution of iron (II) sulfate in 12.0 g of Triton X-100 was added followed by a solution of 0.2 g of 30 wt. % (in water) hydrogen peroxide in 2 g of DI Water. A monomer mixture was then fed to the reactor which consisted of: 219 g of DI water, 125 g of a 19.2% solution of Airvol-205 (partially hydrolyzed polyvinyl alcohol) in water, 304 g of vinyl acetate, 488 g of n-butyl acrylate, and 8 g of acrylic acid. The monomer mixture was fed over 170 minutes. At the same time as the monomer mixture feed, the following two solutions were cofed: 1.6 g of 30 wt. % hydrogen peroxide (in water) dissolved in 39.8 g of DI water and 0.8 g of sodium sulphoxylate formaldehyde dissolved in 41 g of DI water. These solutions were fed over 180 minutes to the reactor. At the completion of the hydrogen peroxide and sodium sulphoxylate formaldehyde feeds the reaction was cooled and 4.8 g of a 15 wt. % solution of sodium carbonate in water was added. Sample 2 had a solids content of 54.8%, a Brookfield viscosity (#3 spindle at 12 rpm) of 1,300 cps., and a Tg(calc.)=−19.7 C.

EXAMPLE 3

Preparation of Vinyl Ester/Acrylic Copolymer

Preparation of Sample 3. Sample 3 was prepared according to the procedure of Example 2 except using the following monomer mixture: 219 g of DI water, 125 g of a 19.2% solution of Airvol-205 (partially hydrolyzed polyvinyl alcohol) in water, 292 g of vinyl acetate, 488 g of n-butyl acrylate, 8 g of acrylic acid and 12 g of N-methyloylacrylamide. The N-methyloylacrylamide was added to the monomer mixture 15 minutes after the start of the feeds. The final product had a solids content of 54.8%, a Brookfield viscosity (#3 spindle at 12 rpm) of greater than 50,000 cps., and a Tg(calc.)=−19.7 C.

EXAMPLE 4

Preparation of Vinyl Ester/Acrylic Copolymer

Preparation of Sample 4. Sample 4 was prepared according to the procedure of Example 2 except using the following monomer mixture: 219 g of DI water, 125 g of a 19.2% solution of Airvol-205 (partially hydrolyzed polyvinyl alcohol) in water, 264 g of vinyl acetate, 488 g of n-butyl acrylate, 8 g of acrylic acid and 40 g of hydroxyethyl acrylate. The hydroxyethyl acrylate was added to the monomer mixture 15 minutes after the start of the feeds. The final product had a solids content of 54.3%, a Brookfield viscosity (#3 spindle at 12 rpm) of 6,300 cps., and Tg(calc.)=−19.7 C.

EXAMPLE 5

Preparation of Vinyl Ester/Acrylic Copolymer

Preparation of Sample 5. Sample 5 was prepared according to the procedure of Example 2 except using the following monomer mixture: 219 g of DI water, 125 g of a 19.2% solution of Airvol-205 (partially hydrolyzed polyvinyl alcohol) in water, 300 g of vinyl acetate, 488 g of n-butyl acrylate, 8 g of acrylic acid and 4 g of acrylamide. The final product had a solids content of 54.3%, Brookfield viscosity (#3 spindle at 12 rpm) of 5,350 cps., and Tg(calc.)=−19.1 C.

EXAMPLE 6

Preparation of Vinyl Ester/Acrylic Copolymer

Preparation of Sample 6. Sample 6 was prepared according to the procedure of Example 2 except using the following monomer mixture: 219 g of DI water, 125 g of a 19.2% solution of Airvol-205 (partially hydrolyzed polyvinyl alcohol) in water, 272 g of vinyl acetate, 488 g of n-butyl acrylate, and 40 g of acrylic acid. The final product had a solids content of 54.7%, Brookfield viscosity (#3 spindle at 12 rpm) of 1,500 cps., and Tg(calc.)=−16.8 C.

EXAMPLE 7

Preparation of Vinyl Ester/Acrylic Copolymer

Preparation of Sample 7. A stirred reactor containing 560.0 g. of deionized (D.I.) water was heated to 65° C. under nitrogen. Then 2 g of a 0.1 wt. % solution of iron (II) sulfate in water and 30 g of Triton X-100 were added followed by a solution of 0.5 g of 30 wt % (in water) hydrogen peroxide in 5 g of DI Water. A monomer mixture was then fed to the reactor which consisted of: 547 g of DI water, 308 g of a 19.6% solution of Airvol-205 (partially hydrolyzed polyvinyl alcohol) in water, 680 g of vinyl acetate, 1,220 g of n-butyl acrylate, and 100 g of acrylic acid. The monomer mixture was fed over 170 minutes. At the same time as the monomer mixture feed, the following two solutions were cofed: 4 g of 30 wt. % hydrogen peroxide (in water) dissolved in 62 g of DI water and 2.1 g of sodium sulphoxylate formaldehyde dissolved in 65 g of DI water. These solutions were fed over 180 minutes to the reactor. At the completion of the hydrogen peroxide and sodium sulphoxylate formaldehyde feeds the reaction was cooled and 9.5 g of a 15 wt. % solution of sodium carbonate in water was added. The final product had a solids content of 55.0%, Brookfield viscosity (RVT Viscometer; #6 spindle at 10 rpm) of 3,500 cps., and Tg=−16.8 C.

EXAMPLE 8

Preparation of Vinyl Ester/Acrylic Copolymer

Preparation of Sample 8. A stirred reactor containing 575.0 g. of deionized (D.I.) water was heated to 65° C. under nitrogen. Then 2 g of a 0.1 wt. % solution of iron (II) sulfate in water and 30 g of Triton X-100 were added followed by a solution of 0.5 g of 30 wt. % (in water) hydrogen peroxide in 5 g of DI Water. A monomer mixture was then fed to the reactor which consisted of: 560 g of DI water, 300 g of a 20% solution of Airvol-205 (partially hydrolyzed polyvinyl alcohol) in water, 500 g of vinyl acetate, 1,480 g of n-butyl acrylate, and 20 g of acrylic acid. The monomer mixture was fed over 170 minutes. At the same time as the monomer mixture feed, the following two solutions were cofed: 4 g of 30 wt. % hydrogen peroxide (in water) dissolved in 62 g of DI water and 2.1 g of sodium sulphoxylate formaldehyde dissolved in 65 g of DI water. These solutions were fed over 180 minutes to the reactor. At the completion of the hydrogen peroxide and sodium sulphoxylate formaldehyde feeds the reaction was cooled and 9.5 g of a 15 wt. % solution of sodium carbonate in water was added. The final product had a solids content of 54.6%, Brookfield viscosity (#3 spindle at 12 rpm) of 3,600 cps., and Tg=−30.9 C.

EXAMPLE 9

Preparation of Vinyl Ester/Acrylic Copolymer

Preparation of Sample 9. A stirred reactor containing 200.0 g. of deionized (D.I.) water was heated to 65° C. under nitrogen. Then 0.8 g of a 0.1 wt. % solution of iron (II) sulfate in water, 12.0 g of Triton X-100, and 24 g of fumaric acid were added followed by a solution of 0.2 g of 30 wt. % (in water) hydrogen peroxide in 2 g of DI Water. A monomer mixture was then fed to the reactor which consisted of: 219 g of DI water, 121 g of a 19.8% solution of Airvol-205 (partially hydrolyzed polyvinyl alcohol) in water, 288 g of vinyl acetate, and 488 g of n-butyl acrylate. The monomer mixture was fed over 162 minutes. At the same time as the monomer mixture feed, the following two solutions were cofed: 1.6 g of 30 wt. % hydrogen peroxide (in water) dissolved in 39.8 g of DI water and 0.8 g of sodium sulphoxylate formaldehyde dissolved in 41 g of DI water. These solutions were fed over 185 minutes to the reactor. At the completion of the hydrogen peroxide and sodium sulphoxylate formaldehyde feeds the reaction was cooled and 4.8 g of a 15 wt. % solution of sodium carbonate in water was added. The final product had a solids content of 52.7%, Brookfield viscosity (#3 spindle at 12 rpm) of 350 cps., and Tg(calc.)=−18.0 C.

EXAMPLE 10

Preparation of Vinyl Ester/Acrylic Copolymer

Preparation of Sample 10. Sample 10 was prepared according to the procedure of Example 2 except using the following monomer mixture: 219 g of DI water, 121 g of a 19.8% solution of Airvol-205 (partially hydrolyzed polyvinyl alcohol) in water, 304 g of vinyl acetate, 488 g of n-butyl acrylate, and 8 g of itaconic acid. The final product had a solids content of 54.7%, Brookfield viscosity (#3 spindle at 12 rpm) of 400 cps., and Tg(calc.)=−19.7 C.

EXAMPLE 11

Preparation of Vinyl Ester/Acrylic Copolymer

Preparation of Sample 11. Sample 11 was prepared according to the procedure of Example 2 except using the following monomer mixture: 220 g of DI water, 123 g of a 19.6% solution of Airvol-205 (partially hydrolyzed polyvinyl alcohol) in water, 304 g of vinyl acetate, 488 g of n-butyl acrylate, and 8 g of itaconic acid. The final product had a solids content of 54.0%, Brookfield viscosity (LVT Viscometer; #6 spindle at 10 rpm) of 300 cps., and Tg(calc.)=−19.7 C.

EXAMPLE 12

Preparation of Vinyl Ester/Acrylic Copolymer

Preparation of Sample 12. Sample 12 was prepared according to the procedure for Sample 2 except using the following monomer mixture: 220 g of DI water, 123 g of a 19.6% solution of Airvol-205 (partially hydrolyzed polyvinyl alcohol) in water, 280 g of vinyl acetate, 488 9 of n-butyl acrylate, and 40 g of methacrylic acid. The final product had a solids content of 54.6%, Brookfield viscosity (LVT Viscometer; #6 spindle at 10 rpm) of 600 cps., and Tg(calc.)=−10.7 C.

EXAMPLE 13

Preparation of Vinyl Ester/Acrylic Copolymer

Preparation of Sample 13. Sample 13 was prepared according to the procedure of Example 2 except using the following monomer mixture: 225 g of DI water, 41 g of a 19.6% solution of Airvol-205 (partially hydrolyzed polyvinyl alcohol) in water, 296 g of vinyl acetate, 488 g of n-butyl acrylate, and 64 g of a 25 wt. % solution of sodium vinyl sulfonate in water. The final product had a solids content of 56.2% and Tg(calc.)=−19.0 C.

EXAMPLE 14

Preparation of Vinyl Ester/Acrylic Copolymer

Preparation of Sample 14. A stirred reactor containing 575 g. of deionized (D.I.) water and 30 g of a nonylphenol 10 mole ethoxylate was heated to 65° C. under nitrogen. Then 2 g of a 0.1 wt. % solution of iron (II) sulfate in water was added, followed by a solution of 0.5 g of 30 wt. % hydrogen peroxide (in water) dissolved in 5 g of DI water. A feed of a monomer mixture consisting of: 560 g of DI water, 300 g of a 20% solution of partially hydrolyzed polyvinyl alcohol (Airvol-205) in water, 700 g of vinyl acetate, 1280 g of 2-ethylhexyl acrylate, and 20 g of acrylic acid, was started. The monomer mixture was fed at 17.5 g/min for 165 min. At the same time as the monomer mixture feed, the following two solutions were cofed: 4.0 g of 30 wt. % hydrogen peroxide (in water) dissolved in 62 g of DI water and 2.1 g of sodium sulphoxylate formaldehyde dissolved in 65 g of DI water, at 0.32 g/min for 180 min. At the completion of the monomer mixture feed an additional 30 g of DI water was added to the reaction. At the completion of the hydrogen peroxide and sodium sulphoxylate formaldehyde feeds the reaction was cooled and adjusted to pH 4.5 with a 15 wt. % solution of sodium carbonate in water. Sample 14 had a solids content of 54.5%, Brookfield viscosity (#4 spindle at 12 rpm) of 16,000 cps, and Tg(calc.)=−29 C.

EXAMPLE 15

Preparation of Vinyl Ester/Acrylic Copolymer

Preparation of Sample 15. Sample 15 was prepared according to the procedure of Example 2 except using the following monomer mixture: 211 g of DI water, 125 g of a 19.2% solution of Airvol-205 (partially hydrolyzed polyvinyl alcohol) in water, 296 g of n-butyl acrylate, 184 g. of 2-ethylhexyl acrylate, 280 g of vinyl acetate, and 40 g of acrylic acid. The final product had a solids content of 55.6%, Brookfield viscosity (RVT viscometer, #6 spindle at 10 rpm) of 1700 cps. and Tg(calc.)=−23.2 C.

EXAMPLE 16

Evaluation of Adhesive Performance

All of the vinyl ester/acrylic copolymer samples were used in their neat form (as prepared) as adhesives, unless otherwise stated.

Sample 1 and comparative sample A were evaluated for low temperature adhesion and high temperature adhesion.

Room Temperature Adhesion (Peel Strength). The adhesive was coated onto a 3 inch×6 inch panel of birch plywood using a #38 wire wound rod. A 4 inch×14 inch piece of 6 mil sandwich vinyl (plasticized polyvinyl chloride(PVC)) was laminated onto the adhesive by pressing three times with a hand-held roller. The laminates were stacked and pressed overnight with a 10 lb. weight. Two 1" peel strips were cut into each laminate. The strips were peeled using an Instron tensile tester at a 180° angle, using a 10 inch/min. peel rate. The average value ( in pounds/linear inch (pli)) of a 6" peel was recorded for each strip. The peel values from three strips (from three different test panels) were averaged to give the final peel strength.

Low Temperature Adhesion. Peel strips were prepared as described herein for the room temperature adhesion test. The laminates were placed in a 10° F. freezer and equilibrated for an hour. The strips were peeled from the plywood manually and the peel strength was qualitatively rated on a scale of 1–5 (1=zips off the plywood, 5=substrate tear). Three strips were tested for each adhesive.

High Temperature Adhesion. (Peel Test). Peel strips were prepared as described herein for the room temperature adhesion test. The laminates were placed in a 150° F. oven and equilibrated for an hour. The samples were removed from the oven one at a time and tested immediately, while hot. One strip from each laminate was peeled using an Instron tensile tester at a 180° angle, using a 10 inch/min. peel rate. The average value (in pounds/linear inch (pli)) of a 6" peel was recorded for each strip. The peel values from three strips (from three different test panels) were averaged to give the final peel strength.

High Temperature Adhesion. (Crosshatch Test; X-hatch Test). The adhesive was coated onto an approximately 3 inch×6 inch panel of birch plywood using a #38 wire wound rod. A 4 inch×14 inch piece of 6 mil sandwich vinyl was laminated onto the adhesive by pressing three times with a hand-held roller. The laminates were stacked and pressed overnight with a 10 lb. weight. An X was cut through the vinyl on the surface of each laminate using a razor blade. The laminates were placed in a 150° F. oven. The number of days until the underlying wood was visible through the X in the vinyl, caused by vinyl separation, was reported. In some cases, the vinyl showed no separation after several weeks in the oven, at which time the test was halted.

Neutralization of Copolymerized Acid. Samples were neutralized by adding an aqueous solution of the specified base or the salt of a base with a weak acid to the neat emulsion polymer, with stirring. The mixtures were stirred for 10 minutes after the addition. The equivalents of added neutralizer used were based on the desired degree of neutralization and the calculated equivalents of copolymerized acid in the polymer.

TABLE 16.1

Evaluation of high and low temperature adhesion in vinyl to plywood laminate

| SAMPLE | R.T Peel (pli) | 10° F. Peel (1–5 ranking) | 150° F. Peel (pli) |
|---|---|---|---|
| Sample 1 | 11.9 pli | 5 | 0.8 |
| Comp A | 8.5 | 1 | 4.4 |

Sample 1 of this invention exhibits superior ambient and low temperature adhesion. Comparative A is a commercial polymer (disclosed Tg=0 C.) which is substantially composed of vinyl acetate and ethylene.

EXAMPLE 17

Evaluation of Adhesive Performance of Vinyl Ester/Acrylic Copolymer Containing 2-ethylhexyl Acrylate Samples 8 and 14 were evaluated for adhesive performance using the methods of Example 16.

TABLE 17.1

Adhesive performance of vinyl ester/acrylic copolymer containing 2-ethylhexyl acrylate

| SAMPLE | R.T Peel (pli) | 150° F. Peel (pli) |
|---|---|---|
| Sample 14 | 12.8 | 2.4 |
| Sample 8 | 12.2 | 0.9 |
| Comp A | 8.4 | 4.8 |

Samples 8 and 14 of this invention exhibit superior low temperature adhesion. Comparative A is a commercial polymer (disclosed Tg=0 C.) which is substantially composed of vinyl acetate and ethylene.

TABLE 17.2

Adhesive performance of vinyl ester/acrylic copolymer containing 2-ethylhexyl acrylate and n-butyl acrylate

| SAMPLE | R.T Peel (pli) | 150° F. Peel (pli) | 150° F. Crosshatch (days) |
|---|---|---|---|
| Sample 15 | 9.2 | 5.6 | 3–6 |
| Comp. A | 7.8 | 5.6 | 3–6 |

Sample 15 of this invention exhibits superior ambient and excellent high temperature adhesion. Comparative A is a commercial polymer (disclosed Tg=0 C.) which is substantially composed of vinyl acetate and ethylene.

EXAMPLE 18

Effect of Polar Monomer on Adhesion in Vinyl to Plywood Laminate

Samples 2–6, 10 and 13 were evaluated for adhesive performance using the methods of Example 16.

TABLE 16.1

Adhesive performance of vinyl ester/acrylic copolymer containing various copolymerized polar monomers

| SAMPLE | R.T Peel (pli) | 150° F. Peel (pli) | 150° F. Crosshatch (days) |
|---|---|---|---|
| Sample 2 (1% AA) | 13.6 | 1.8 | 3 |
| Sample 3 (1.5% NMA) | 12.2 | 4.7 | 4 |
| Sample 4 (5% HEA) | 11.0 | 2.9 | 3 |
| Sample 5 (0.5% Am) | 13.1 | 3.6 | 3 |
| Sample 6 (5% AA) | 9.1 | 4.6 | 5 |
| Comp A | 8.6 | 5.5 | 7 |

TABLE 18.2

Adhesive performance of vinyl ester/acrylic copolymer containing copolymerized itaconic acid (IA) polar monomer

| SAMPLE | R.T Peel (pli) | 150° F. Peel (pli) | 150 F. Crosshatch (days) |
|---|---|---|---|
| Sample 10 (1% IA) | 8.4 | 4.2 | 4 |
| Sample 10 + 0.5 eq KOH | 7.9 | 3.9 | 14 |
| Sample 10 + 1 eq KOAc | 8.6 | 4.0 | 14 |
| Comp A | 8.8 | 5.3 | 7 |

TABLE 18.3

Adhesive performance of vinyl ester/acrylic copolymer containing copolymerized sodium vinyl sulfonate (SVS) polar monomer

| SAMPLE | R.T Peel (pli) | 150° F. Peel (pli) | 150° F. Crosshatch (days) |
|---|---|---|---|
| Sample 2 (1% AA) | 12.3 | 2.0 | 1 |
| Sample 13 (2% SVS) | 5.9 | 3.2 | 2–5 |
| Comp A | 8.8 | 5.9 | 2–5 |

Samples 2–6, 10, and 13 of this invention incorporating various polar comonomers exhibit good high temperature and room temperature vinyl adhesion. Comparative A is a commercial polymer (Tg=0 C.) which is substantially composed of vinyl acetate and ethylene.

EXAMPLE 19

Effect of Neutralization of Copolymerized Acid Monomer on Adhesion in Vinyl to Plywood Laminate Sample 6 at various degrees of neutralization was evaluated for adhesive performance using the methods of Example 16. Samples were neutralized by adding an aqueous solution of the specified base to the neat emulsion polymer. The mixture was stirred for 10 minutes.

TABLE 19.1

Effect of neutralization on adhesion in vinyl to plywood laminate

| SAMPLE | R.T Peel (pli) | 150° F. Peel (pli) | 150° F. X-hatch (days) |
|---|---|---|---|
| Sample 6 | 10.8 | 5.0 | 2 |
| Sample 6/0.25 eq KOH | 10.8 | 7.4 | >14 |
| Sample 6/0.5 eq KOH | 10.2 | 8.7 | >14 |
| Sample 6/0.5 eq NaOH | 11.1 | 7.4 | >14 |
| Comp A | 9.8 | 5.7 | 5 |

The neutralization of copolymerized acid of Sample 6 of this invention dramatically improves the high temperature vinyl adhesion and crosshatch adhesion performance. Comparative A is a commercial polymer (Tg=0 C.) which is substantially composed of vinyl acetate and ethylene.

EXAMPLE 20

Effect of Neutralization of Copolymerized Acid Monomer With Acid Salts on Adhesion in Vinyl to Plywood Laminate Sample 6 at various degrees of neutralization with acid salts was evaluated for adhesive performance using the methods of Example 15.

TABLE 20.1

Effect of neutralization with acid salts on adhesion in vinyl to plywood laminate

| SAMPLE | R.T Peel (pli) | 150° F. Peel (pli) | 150° F. Crosshatch (days) |
|---|---|---|---|
| Sample 6 | 12.3 | 5.2 | 4 |
| Sample 6 + 1 eq KOAc | 12.0 | 6.9 | >14 |
| Comp A | 9.7 | 6.0 | 7 |

TABLE 20.2

Effect of neutralization with strong acid salts on adhesion in vinyl to plywood laminate

| SAMPLE | R.T Peel (pli) | 150° F. Peel (pli) | 150° F. Crosshatch (days) |
|---|---|---|---|
| Sample 6 | 10.8 | 5.0 | 2 |
| Sample 6 + 0.5 eq MgCl2 | 9.8 | 4.3 | 2 |
| Sample 6 + 0.5 eq AlCl3 | 7.4 | 5.2 | 4 |
| Sample 6 + 0.5 eq CaCl2 | 9.4 | 4.0 | 2 |
| Sample 6 + 1 eq CaCl2 | 9.3 | 3.6 | 2 |
| Comp A | 9.8 | 5.7 | 5 |

Weak acid salts can be used, in place of bases to neutralize the acid; they improve high temperature performance. The salts of strong acids, however, do not give improved high temperature performance. Comparative A is a commercial polymer (Tg=0 C.) which is substantially composed of vinyl acetate and ethylene.

EXAMPLE 21

Effect of Neutralization of Copolymerized Acid Monomer With Various Weak Acid Salts on Adhesion in Vinyl to Plywood Laminate Sample 7 at various degrees of neutralization with weak acid salts was evaluated for adhesive performance using the methods of Example 16.

TABLE 21.1

Effect of neutralization with weak acid salts on adhesion in vinyl to plywood laminate

| SAMPLE | R.T Peel (pli) | 150° F. Peel (pli) | 150° F. Crosshatch (days) |
|---|---|---|---|
| Sample 7 | 10.0 | 4.6 | 2–6 |
| Sample 7 + 0.5 eq Na Formate | 10.8 | 5.2 | >14 |
| Sample 7 + 1 eq Na Formate | 8.6 | 4.6 | >14 |
| Sample 7 + 0.5 eq Zn Acetate | 6.8 | 4 | >14 |
| Sample 7 + 1 eq Zn Acetate | 5.4 | 3.1 | >14 |
| Comp A | 8.7 | 5.5 | 2–6 |

TABLE 21.2

Effect of neutralization with weak acid salts on adhesion in vinyl to plywood laminate

| SAMPLE | R.T Peel (pli) | 150° F. Peel (pli) | 150° F. Crosshatch (days) |
|---|---|---|---|
| Sample 7 | 9.9 | 4.8 | 3 |
| Sample 7 + 0.5 eq Na Citrate | 7.6 | 6.1 | 10 |
| Sample 7 + 1 eq Na Citrate | 6.8 | 6.4 | >14 |
| Sample 7 + 0.5 eq Na Acetate | 9.7 | 6.0 | >14 |
| Sample 7 + 1 eq Na Acetate | 9.1 | 5.8 | >14 |
| Comp A | 8.2 | 6.4 | 5–7 |

Nonvolatile weak acid salts can be used in place of bases to neutralize the acid; they also improve high temperature performance.

EXAMPLE 22

Effect of Various Copolymerized Acids With and Without Neutralization on Adhesion in Vinyl to Plywood Laminate Samples 9 and 11–12 incorporating various copolymerized acids were evaluated with and without neutralization for adhesion to vinyl substrate according to the methods of Example 16.

TABLE 22.1

Effect of various copolymerized acids with and without neutralization on adhesion in vinyl to plywood laminate

| SAMPLE | R.T Peel (pli) | 10° F. Peel (1–5 rank) | 150° F. Peel (pli) | 150° F. Crosshatch (days) |
|---|---|---|---|---|
| Sample 9 (3% FA) | 8.4 | 5 | 5.1 | 3–6 |
| Sample 9 + 0.5 eq KOH | 8.1 | 5 | 4.9 | >14 |
| Sample 9 + 1 eq KOAc | 8.2 | 3 | 4.4 | >14 |
| Sample 11 (2% MAn) | 12.2 | 5 | 3.4 | 3–6 |
| Sample 11 + 0.5 eq KOH | 12.4 | 5 | 3.3 | >14 |
| Sample 12 (5 MAA) | 9.2 | 5 | 4.5 | 2 |
| Sample 12 + 0.5 eq KOH | 7.7 | 5 | 7.3 | >14 |
| Sample 12 + 1 eq KOAc | 8.3 | 5 | 4.6 | 3–6 |
| Comp A | 8.3 | 2 | 5.3 | 6 days |

Samples 9 and 11–12 of this invention incorporating various copolymerized acid monomers neutralized with bases or weak acid salts exhibit a good balance of low temperature, ambient temperature, and high temperature adhesion performance. Comparative A is a commercial polymer (Tg=0 C.) which is substantially composed of vinyl acetate and ethylene.

EXAMPLE 23

Effect of degree of neutralization on the adhesion of construction adhesive compositions containing vinyl acetate/ethylene copolymers An adhesive copolymer disclosed to be a polyvinyl alcohol-stabilized carboxylated vinyl acetate/ethylene copolymer with Tg=0 C. (AIRFLEX 426) and an adhesive copolymer disclosed to be an hydroxyethyl cellulose-stabilized carboxylated vinyl acetate/ethylene copolymer with Tg=11 C. (ELVACE 40722-00) were evaluated with and without neutralization with potassium hydroxide added on a weight % basis, solids on solids, for adhesion to vinyl substrate according to the methods of Example 16. Comparative A is an uncarboxylated commercial polymer (Tg=0 C.) which is substantially composed of vinyl acetate and ethylene.

TABLE 23.1

Effect of KOH neutralization on performance

| SAMPLE | R.T. PEEL | 150° F. PEEL | 150° F. CROSSHATCH |
|---|---|---|---|
| Comparative A | 8.3 | 5.4 | 7 days |
| Comparative A + 0.31% KOH | 8.2 | 4.4 | 7 days |
| Comparative A + 0.93% KOH | 8.0 | 5.4 | 7 days |
| Comparative A + 1.9% KOH | 6.7 | 5.6 | 7 days |
| Comparative A + 3.1% KOH | 5.9 | 5.4 | 8 days |
| Comparative A + 6.2% KOH | 4.9 | 4.7 | 6 days |
| Comparative A + 12.4% KOH | 4.9 | 4.1 | 6 days |
| Airflex 426 | 8.2 | 6.1 | 8 days |
| Airflex 426 + 0.31% KOH | 7.7 | 6.4 | >15 days |
| Airflex 426 + 0.93% KOH | 7.2 | 6.3 | 7 days |
| Airflex 426 + 1.9% KOH | 6.6 | 7.1 | 6 days |
| Airflex 426 + 3.1% KOH | 6.8 | 7.5 | 7 days |
| Airflex 426 + 6.2% KOH | 6.7 | 5.2 | >15 days |
| Airflex 426 + 12.4% KOH | 4.9 | 3.8 | >15 days |
| Elvace 40722-00 | 8.4 | 4.2 | 2 days |
| Elvace 40722-00 + 0.31% KOH | 9.0 | 4.2 | 2 days |
| Elvace 40722-00 + 0.93% KOH | 9.5 | 5.3 | 2 days |
| Elvace 40722-00 + 1.9% KOH | 9.1 | 5.7 | 1 day |
| Elvace 40722-00 + 3.1% KOH | 8.6 | 5.6 | 1 day |
| Elvace 40722-00 + 6.2% KOH | 6.3 | 4.8 | 1 day |
| Elvace 40722-00 + 12.4% KOH | 6.2 | 4.8 | 2 days |

Neutralization with a strong nonvolatile base, potassium hydroxide, improves the high temperature performance of a carboxylated vinyl acetate/ethylene adhesive polymer when 150 F. peel strength and 150 F. crosshatch performance are taken as indicators. We believe that the adhesion performance drops off at high KOH levels due to the high amounts of salt introduced thereby.

EXAMPLE 24

Effect of Degree of Neutralization on the Adhesion of Construction Adhesive Compositions Containing Vinyl Acetate/Ethylene Copolymers The adhesive copolymers of Example 23 were evaluated with and without neutralization with potassium acetate (KOAc) added on a weight % basis, solids on solids, for adhesion to vinyl substrate according to the methods of Example 16. Comparative A is an uncarboxylated commercial polymer (Tg=0 C.) which is substantially composed of vinyl acetate and ethylene.

TABLE 24.1

Effect of KOAc neutralization on performance

| SAMPLE | R.T. PEEL | 150° F. PEEL | 150° F. CROSSHATCH |
|---|---|---|---|
| Comparative A | 9.3 | 5.9 | 5 days |
| Comparative A + 0.27% KOAc | 8.9 | 5.6 | 2–4 days |
| Comparative A + 0.55% KOAc | 8.8 | 4.8 | 5 days |
| Comparative A + 1.6% KOAc | 7.7 | 5.0 | 5 days |
| Comparative A + 3.3% KOAc | 8.5 | 4.9 | 5 days |
| Comparative A + 5.4% KOAc | 8.2 | 4.7 | 5 days |
| Comparative A + 10.9% KOAc | 5.1 | 4.1 | 6 days |
| Comparative A + 21.8% KOAc | 5.3 | 3.9 | 12 days |
| Airflex 426 | 7.0 | 6.0 | 5 days |
| Airflex 426 + 0.27% KOAc | 7.3 | 5.9 | 5 days |
| Airflex 426 + 0.55% KOAc | 7.3 | 6.3 | 13 days |
| Airflex 426 + 1.6% KOAc | 7.7 | 6.6 | 13 days |
| Airflex 426 + 3.3% KOAc | 7.6 | 6.1 | >15 days |
| Airflex 426 + 5.4% KOAc | 8.2 | 6.4 | >15 days |
| Airflex 426 + 10.9% KOAc | 7.3 | 5.6 | >15 days |
| Airflex 426 + 21.8% KOAc | 6.3 | 4.0 | >15 days |
| Elvace 40722-00 | 9.4 | 4.3 | 1 day |
| Elvace 40722-00 + 0.27% KOAc | 8.3 | 4.3 | 2–4 days |
| Elvace 40722-00 + 0.55% KOAc | 9.4 | 4.3 | 2–4 days |
| Elvace 40722-00 + 1.6% KOAc | 9.2 | 4.2 | 2–4 days |
| Elvace 40722-00 + 3.3% KOAc | 8.8 | 4.0 | 2–4 days |
| Elvace 40722-00 + 5.4% KOAc | 8.5 | 4.2 | 5 days |
| Elvace 40722-00 + 10.9% KOAc | 8.5 | 4.2 | >15 days |
| Elvace 40722-00 + 21.8% KOAc | 6.7 | 3.6 | >15 days |

Neutralization with a nonvolatile weak acid salt, potassium acetate, improves the high temperature performance of a carboxylated vinyl acetate/ethylene adhesive polymer when 150 F. peel strength and 150 F. crosshatch performance are taken as indicators. We believe that the adhesion performance drops off at high KOAc levels due to the high amounts of salt introduced thereby.

What is claimed is:

1. A method of wet-laminating a film or foil substrate and a construction substrate comprising
   (a) forming a one-part aqueous, organic solvent-free laminating adhesive composition comprising an adhesive copolymer consisting essentially of a vinyl ester/acrylic copolymer comprising from about 0.1% to about 20%, by weight based on copolymer weight, of a copolymerized ethylenically unsaturated carboxylic acid monomer, wherein said copolymerized carboxylic acid is neutralized to the extent of from 5% to 100%, on an equivalents basis, with a nonvolatile base, said copolymer having a glass transition temperature from about 10 C. to about −35 C.

(b) applying said composition to a first substrate;

(c) contacting said composition with a second substrate; and (d) drying said composition.

2. The method of claim 1 wherein said glass transition temperature is from about −5 C. to about −25 C..

3. The method of claim 1 wherein said copolymer comprises a stabilizer selected from the group consisting of hydroxyethyl cellulose and polyvinyl alcohol.

4. The method of claim 1 wherein said copolymer comprises from about 0.2% to about 10%, by weight based on copolymer weight, of said copolymerized polar monomer.

5. The method of claim 1 wherein said copolymer comprises a copolymerized acrylic monomer selected from the group consisting of n-butyl acrylate and 2-ethylhexyl acrylate.

6. The method of claim 1 wherein said vinyl ester/acrylic copolymer is a vinyl acetate/butyl acrylate/2-ethylhexyl acrylate/acrylic acid copolymer comprising from about 0.1% to about 20%, by weight based on said copolymer weight, of acrylic acid, said copolymer having a glass transition temperature from about 10 C. to about −35 C.

7. A laminate prepared by the method of claim 1.

* * * * *